US011755543B2

(12) United States Patent
Vasileiadis et al.

(10) Patent No.: US 11,755,543 B2
(45) Date of Patent: Sep. 12, 2023

(54) OPTIMIZATION OF WORKFLOWS WITH DYNAMIC FILE CACHING

(71) Applicant: INTERNATIONAL BUSINESS MACHINES CORPORATION, Armonk, NY (US)

(72) Inventors: Vasileios Vasileiadis, Dublin (IE); Christian Pinto, Dublin (IE); Michael Johnston, Dublin (IE); Ioannis Gkoufas, East Road (IE); Srikumar Venugopal, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 17/137,187

(22) Filed: Dec. 29, 2020

(65) Prior Publication Data
US 2022/0206999 A1   Jun. 30, 2022

(51) Int. Cl.
*G06F 16/00* (2019.01)
*G06F 16/182* (2019.01)
(Continued)

(52) U.S. Cl.
CPC .......... *G06F 16/182* (2019.01); *G06F 9/4881* (2013.01); *G06F 9/505* (2013.01);
(Continued)

(58) Field of Classification Search
CPC .......... G06F 9/54; G06F 9/44; G06F 3/04812; G06F 3/04817; G06F 3/04842;
(Continued)

(56) References Cited

U.S. PATENT DOCUMENTS 7,133,833 B1 *  11/2006  Chone .................... G06Q 10/10
                                                    705/7.27
7,805,324 B2 *   9/2010  Green ................ G06Q 10/0633
                                                    717/106
(Continued)

FOREIGN PATENT DOCUMENTS

CA     2827957 A1    4/2014
EP     3855313 A1 *  7/2021
(Continued)

OTHER PUBLICATIONS

Karan Vahi et al., "Rethinking data management for big data scientific workflows", 2013 IEEE International Conference on Big Data, Oct. 2013, pp. 27-35.*

(Continued)

*Primary Examiner* — Srirama Channavajjala
(74) *Attorney, Agent, or Firm* — Intelletek Law Group, PLLC; Gabriel Daniel, Esq.

(57) ABSTRACT

A computer implemented method for optimizing performance of workflow includes associating each of a plurality of workflow nodes in a workflow with a data cache and managing the data cache on a local storage device on one of one or more compute nodes. A scheduler can request execution of the tasks of a given one of the plurality of workflow nodes on one of the one of more compute nodes that hosts the data cache associated with the given one of the plurality of workflow nodes. Each of the plurality of workflow nodes is permitted to access a distributed filesystem that is visible to each of the plurality of compute nodes. The data cache stores data produced by the tasks of the given one of the plurality of workflow nodes.

18 Claims, 5 Drawing Sheets

(51) Int. Cl.

| | |
|---|---|
| *G06F 9/48* | (2006.01) |
| *G06F 16/901* | (2019.01) |
| *G06F 16/14* | (2019.01) |
| *G06F 9/50* | (2006.01) |
| *G06F 16/17* | (2019.01) |

(52) U.S. Cl.
CPC .......... *G06F 9/5077* (2013.01); *G06F 16/14* (2019.01); *G06F 16/1734* (2019.01); *G06F 16/9024* (2019.01); *G06F 2209/508* (2013.01)

(58) Field of Classification Search
CPC .. G06F 16/10–11; G06F 16/116; G06F 16/13; G06F 16/164; G06F 16/166; G06F 16/185; G06F 16/278; G06F 16/383
See application file for complete search history.

(56) References Cited

U.S. PATENT DOCUMENTS

| | | | |
|---|---|---|---|
| 8,775,395 B2 * | 7/2014 | Balinsky | G06Q 10/101 707/704 |
| 8,868,506 B1 | 10/2014 | Bhargava et al. | |
| 8,935,275 B2 * | 1/2015 | Rathod | H04W 4/60 707/706 |
| 9,189,509 B1 * | 11/2015 | Tsypliaev | G06F 16/9024 |
| 9,971,513 B2 | 5/2018 | Bilas et al. | |
| 10,310,950 B2 | 6/2019 | Kochunni et al. | |
| 10,430,253 B2 * | 10/2019 | Davis | G06Q 10/06 |
| 2002/0170035 A1 * | 11/2002 | Casati | G06F 8/10 717/127 |
| 2007/0055558 A1 * | 3/2007 | Shanahan | G06Q 10/06 705/7.26 |
| 2007/0106541 A1 * | 5/2007 | Raisanen | G06Q 10/063 705/7.26 |
| 2008/0065448 A1 * | 3/2008 | Hull | G06Q 10/06 705/7.26 |
| 2011/0231849 A1 | 9/2011 | Saha et al. | |
| 2012/0330954 A1 * | 12/2012 | Sivasubramanian | G06F 16/252 707/E17.089 |
| 2013/0073724 A1 * | 3/2013 | Parashar | G06F 9/5038 709/224 |
| 2014/0108485 A1 * | 4/2014 | Geibel | G06F 9/5061 709/201 |
| 2014/0358844 A1 * | 12/2014 | Mundlapudi | G06F 16/254 707/602 |
| 2015/0067088 A1 * | 3/2015 | Guerin | H04L 67/51 709/213 |
| 2016/0041846 A1 | 2/2016 | Bartlett et al. | |
| 2017/0329792 A1 | 11/2017 | Banerjee et al. | |
| 2018/0210940 A1 * | 7/2018 | Shmueli | G06F 16/28 |
| 2018/0225311 A1 * | 8/2018 | Bandopadhyay | G06F 16/9024 |
| 2018/0349197 A1 | 12/2018 | Eda et al. | |
| 2018/0365614 A1 * | 12/2018 | Palmer | G06Q 10/103 |
| 2019/0068438 A1 | 2/2019 | Kumar et al. | |
| 2020/0183836 A1 | 6/2020 | Johns et al. | |
| 2020/0202246 A1 | 6/2020 | Lin et al. | |
| 2020/0364084 A1 * | 11/2020 | Zheng | H04L 63/12 |
| 2021/0208953 A1 * | 7/2021 | Vasileiadis | G06F 9/5083 |

FOREIGN PATENT DOCUMENTS

| | | | |
|---|---|---|---|
| WO | WO2000034909 A1 * | 6/2000 | |
| WO | WO2010098864 A2 * | 9/2010 | |
| WO | WO2017003454 A1 * | 1/2017 | |
| WO | WO 2020016451 A1 * | 1/2020 | |

OTHER PUBLICATIONS

Luis Pineda-Morales et al., "Towards Multi-site Metadata Management for Geographically Distributed Cloud Workflows", 2015 IEEE International Conference on Cluster Computing, Oct. 2015, pp. 294-303.*

Sara Riazi et al., "GraphFlow: Workflow-based big graph processing", IEEE International Conference on Big Data (Big Data), Dec. 2016, pp. 3336-3343.*

Tanaka, M, "Workflow Scheduling to Minimize Data Movement Using Multi-constraint Graph Partitioning", 2012 12th IEEE/ACM International Symposium on Cluster, Cloud and Grid Computing (ccgrid May 2012) (pp. 65-72).*

International Search Report and Written Opinion dated Feb. 11, 2022 in related application PCT/CN2021/129790; 10 pgs.

Tanaka, M. et al., "Disk Cache-Aware Task Scheduling For Data-Intensive and Many-Task Workflow"; IEEE Cluster (2014); 9 pgs.

Hasham, K. et al., "CMS Workflow Execution using Intelligent Job Scheduling and Data Access Strategies"; IEEE T NUCL SCI (2011); 12 pgs.

Xu, Y., "Workflow System Performance Improving and Analyzing by Using Memory Cache"; International Conference on Computer Science and Intelligent Communication (2015).

Chiu, D. et al., "Hierarchical Caches for Grid Workflows"; 9th IEEE/ACM International Symposium on Cluster Computing and the Grid (2009); 8 pgs.

Yoon, J. et al., "An Algorithm for Modularity Analysis of Directed and Weighted Biological Networks Based on Edge-Betweenness Centrality"; Bioinformatics (2006); vol. 22:4; pp. 3106-3018.

* cited by examiner

OPTIMIZATION OF WORKFLOWS WITH DYNAMIC FILE CACHING

BACKGROUND

Technical Field

The present disclosure generally relates to systems and methods for optimizing the performance of computational workflows, and more particularly, to methods and systems for transparently using high-bandwidth/low-latency storage devices as file system caches to optimize the performance of computational workflows.

Description of the Related Art

Workflows are typically formed out of existing resources rather than built from scratch. They can include many workflow nodes, each implemented by many different developers and scientists which are typically from different scientific disciplines.

Workflow nodes typically communicate over file systems due to the large volumes of data that they process. The better the communication between workflow nodes, the better the overall performance of the enveloping workflows. As a result, optimizing the interaction of the workflow nodes with the file system is a factor in workflow orchestration.

SUMMARY

According to various embodiments, a computing device, a non-transitory computer readable storage medium, and a method are provided for optimizing workflow performance through dynamic file caching.

In one embodiment, a computer implemented method for optimizing performance of workflow includes associating each of a plurality of workflow nodes in a workflow with, at most, one respective data cache and managing the data cache on a local storage device on one of one or more compute nodes. A scheduler can request execution of the tasks of a given one of the plurality of workflow nodes on one of the one of more compute nodes that hosts the data cache associated with the given one of the plurality of workflow nodes. Each of the plurality of workflow nodes is permitted to access a distributed filesystem that is visible to each of the plurality of compute nodes. The data cache stores data produced by the tasks of the given one of the plurality of workflow nodes.

In some embodiments, the method further includes provisioning a write-back data cache on each of the plurality of compute nodes, the write-back data cache storing data to be copied to the distributed filesystem.

In some embodiments, the method further includes partitioning the workflow into a plurality of sub-graphs based on an expected file input/output for each workflow node, each of the plurality of sub-graphs defined by one or more sub-graph nodes, and associating the one or more sub-graph nodes in each of the plurality of sub-graphs to a single one of the data cache.

In some embodiments, the method further includes querying a metadata database for information about past instances of the tasks of each workflow node to determine the expected file input/output for each workflow node.

In some embodiments, the method further includes monitoring a file input/output of the tasks of each workflow node during execution of the workflow to determine the expected file input/output for each workflow node.

In some embodiments, the method further includes permitting a select workflow node belonging to a first sub-graph to move to a second sub-graph based on a comparison of an expected file input/output of the select workflow node in the first sub-graph and the second sub-graph.

In some embodiments, the method further includes monitoring a file input/output volume for each workflow node with a storage middle-layer.

In some embodiments, the method further includes storing the monitored file input/output volume for each workflow node in a metadata database.

In some embodiments, the method further includes orchestrating storage of data produced by each of the plurality of workflow nodes into the data cache associated with each of the plurality of workflow nodes.

In some embodiments, the method further includes, when the scheduler is unable to execute tasks of the given one of the plurality of workflow nodes on the one of the compute nodes that hosts the data cache associated with the given one of the plurality of workflow nodes, redirecting writing of data produced by the given one of the plurality of workflow nodes to the one of the compute nodes that hosts the data cache associated with the given one of the plurality of workflow nodes.

In some embodiments, the method further includes transparently mutating files between workflow nodes to provide data privacy.

According to various embodiments, a computer implemented method for optimizing performance of workflows includes partitioning the workflow into a plurality of sub-graphs based on an expected file input/output for each workflow node, where each of the plurality of sub-graphs defined by one or more sub-graph nodes. The one or more sub-graph nodes in each of the plurality of sub-graphs are associated with, at most, a respective one of the data cache. Each data cache is associated with a unique identification, where the unique identification further associated with the one of the plurality of sub-graphs. Each data cache is managed on a local storage device on one of one or more compute nodes. A scheduler can request execution of tasks of a given one of the plurality of workflow nodes on one of the one or more compute nodes that hosts the data cache associated with the given one of the plurality of workflow nodes based on the unique identification. Each of the plurality of workflow nodes is permitted to access a distributed filesystem that is visible to each of the plurality of compute nodes. The data cache and the distributed filesystem store data produced by the tasks of the given one of the plurality of workflow nodes.

By virtue of the concepts discussed herein, a system and method are provided that improves upon the approaches currently used to execute computational workflows. The system and methods discussed herein can improve the performance of workflow execution and reduce computational resources required for achieving such improved performance by utilizing dynamic file caching as described herein.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
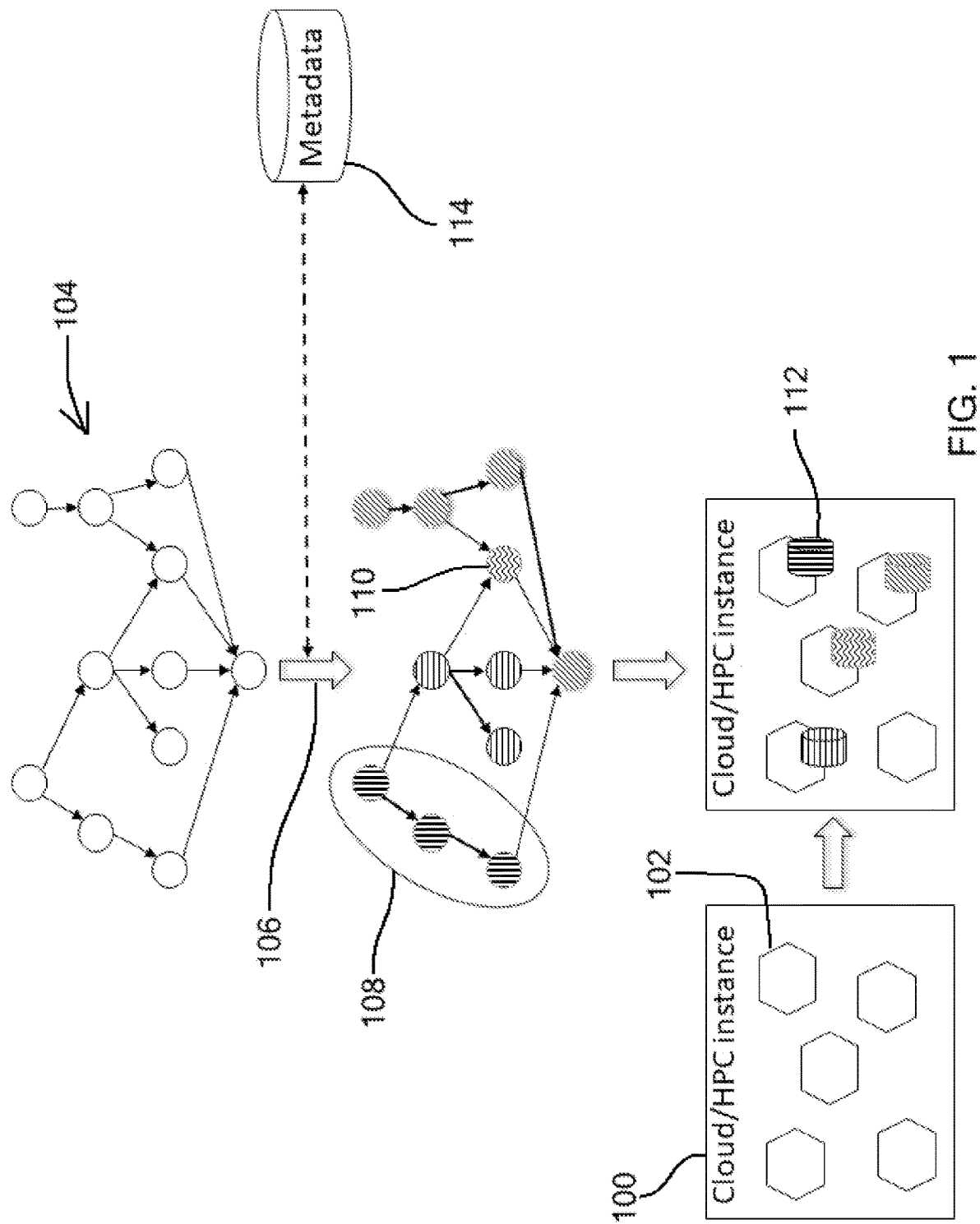
FIG. 1 is a representation of workflow execution, sub-graph formation, and data cache assignment, according to an embodiment of the present disclosure.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As used herein, the term "workflow" refers to directed acyclic graphs, where edges indicate dependencies between the workflow nodes. A single workflow node may execute multiple tasks during its lifetime.

As used herein, the term "workflow node" (WFN) refers to an application or service that is part of a workflow.

As used herein, the term "MakeSpan" refers to the time it takes for nodes of a workflow to produce output data. The smaller the MakeSpan the better it is (i.e., a more responsive workflow).

As used herein, the term "high performance computing systems" (HPC) refers to computers, typically in the form of clusters, that are typically programmed to be a part of large computations using so-called high performance computing programming paradigms, such as message passing interface (MPI).

As used herein, the term "write-back data cache" refers to data written to the cache and eventually copied to the underlying filesystem. In the context of the present disclosure, the underlying filesystem can be a distributed filesystem.

As used herein, the term "compute node" (CMPN) refers to a computing system that is used to carry out computations in the context of a cloud or HPC instance.

As discussed in greater detail below, the present disclosure generally relates to methods and systems for targeting execution of computational workflows on a cloud or traditional HPC infrastructure alike, where the workflow is enabled to transparently use high-bandwidth and/or low-latency storage devices to optimize the MakeSpan or performance of workflows. The methods described herein can partition workflow graphs into smaller sub-graphs so that the sub-graphs can make use of high-bandwidth storage devices for intra-sub-graph communication. In turn, the entire MakeSpan of the workflow can be optimized. The mechanism can be designed to be completely transparent to the end user and can function in various infrastructures, such as cloud and traditional HPC infrastructure.

At a high-level, where further details are provided in the paragraphs that follow, aspects of the present disclosure can provide the following features: 1) a cloud/HPC-wide data cache daemon can be employed to manage data caches on compute node local storage devices, such as non-volatile memory express, solid-state drives, hard disk drives, and the like, that offer high bandwidth file input/output (I/O) to tasks of workflow nodes that are scheduled on the same compute nodes; 2) workflows can be partitioned into multiple sub-graphs such that workflow nodes in the same sub-graph have high intra-sub-graph file I/O; 3) each workflow is associated with a single data cache that is tagged with a unique identifier of the sub-graph to which the workflow node belongs; 4) the data cache daemon can be used to provision and manage write-back data caches on the compute nodes; 5) for workflow node A, that belongs to a sub-graph, hints can be provided to a cloud/HPC scheduler requesting that tasks of workflow node A are executing on compute nodes hosting data caches associated with the workflow nodes of the subgraph that workflow A belongs; 6) a distributed filesystem can be used that is visible to all compute nodes, where workflow nodes can access files produced by other workflow nodes; 7) an optional storage middle layer can monitor the traffic between workflow nodes to estimate the file I/O of workflow node tasks and can redirect file operations of workflow node tasks to a) the distributed filesystem that is available to all compute nodes, and b) high bandwidth data-caches that are available on select compute nodes; and 8) an optional data privacy module can be provided for data privacy, security, and/or isolation that transparently mutates files between workflow nodes.

Reference now is made in detail to the details illustrated in the accompanying drawings and discussed below.

Referring to FIG. 1, an overview of aspects of the present disclosure is provided. Initially, the cloud/HPC instance 100 has no data caches on the compute nodes 102. The workflow 104 can begin its execution and, as illustrated by arrow 106, the workflow 104 can be partitioned by a workflow orchestrator 300 (see FIG. 3) into sub-graphs 108, where the sub-graphs have high intra-subgraph file input/output (I/O), as described in greater detail below. In some embodiments, as illustrated below, a metadata database 114 can be provided to help the formation of the sub-graphs 108.

The workflow orchestrator 300 does not need to assign all workflow nodes, such as workflow node 110, to a sub-graph 108. In the example workflow 104, it turns out that the workflow node 110 does not have intense file I/O with any of the workflow nodes it shares an edge. The workflow orchestrator 300 can choose not to assign workflow node 110 to any sub-graph 108. In turn, the underlying scheduler is free to choose the compute node 102 that will execute tasks of the workflow node 110 without any restriction of placing it on a compute node 102 that contains some specific data cache.

One data cache 112 per workflow node can be created by the workflow orchestrator 300. Each workflow node can be a part of at most one sub-graph 108. If workflow node A is expected to have a large file I/O involving multiple sub-graphs, this workflow node can get grouped under the sub-graph with which it exhibits the highest file I/O. Workflow node A can access the data produced by workflow nodes in other sub-graphs a) via the distributed filesystem after the files have been written back to it and/or b) via the optional storage middle layer 210 which will redirect the file operations to the appropriate compute node 102 which hosts the data cache 112 containing the referenced files, as discussed below. An optional storage middle layer 210, as discussed below with respect to FIG. 2, can make it possible for workflow nodes to transparently communicate with each other, even if they cannot be scheduled on the same compute node 102.

In FIG. 1, each sub-graph 108 is indicated by a differently patterned shape. Each data cache 112 for the workflow nodes of a particular sub-graph 108 is similarly patterned.

Figure 2:
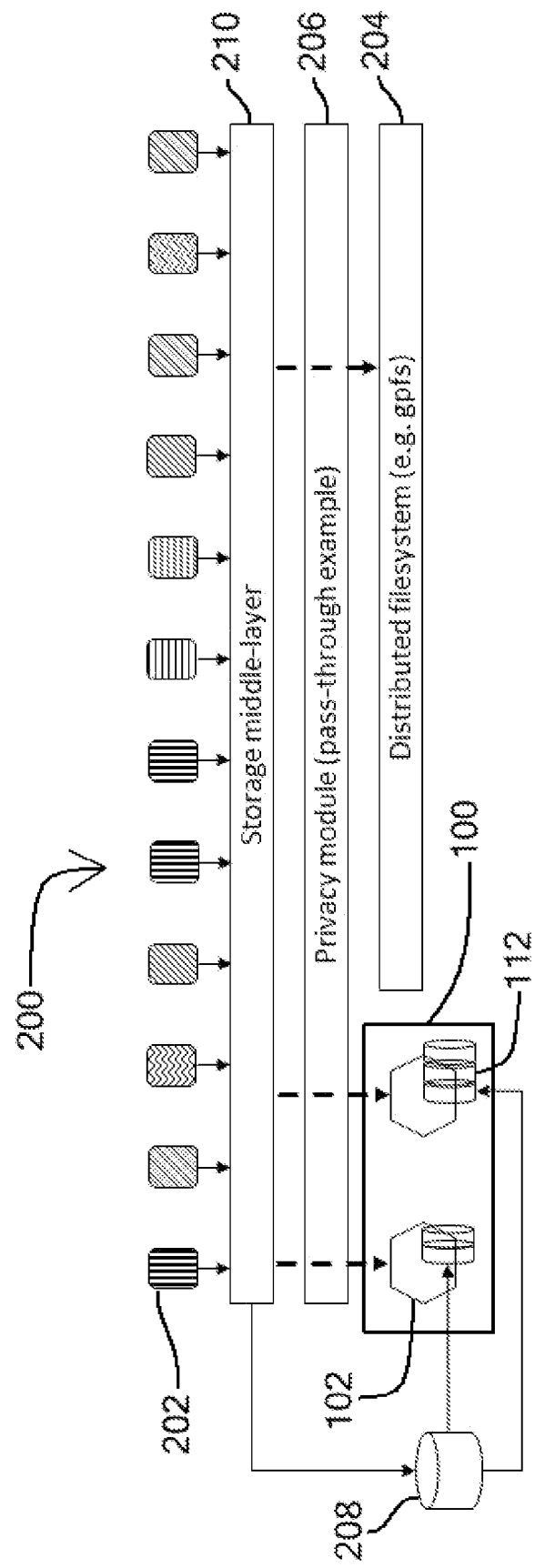
FIG. 2 is a representation of a file system hierarchy used in the methods and systems for optimization workflow performance, consistent with an illustrative embodiment.

Referring now to FIG. 2, a filesystem hierarchy 200 is illustrated, where workflow node tasks 202 can access files produced by other workflow nodes via an optional storage middle-layer 210. The storage middle-layer 210 can act as a proxy between file operations of workflow tasks 202 and the distributed filesystem 204 and/or the data caches 112 that are hosted on compute nodes 102 of the cloud/HPC instance 100. A data cache daemon 208 provisions and manages data caches 112 and write-back caches 312 on compute nodes 102. The storage middle-layer 210 can prioritize forwarding a file operation of a workflow node task 202 to a data cache 112, but if the latter does not exist on the compute node 102 that is running the task, then the storage middle-layer 210 can propagate the file operation to a compute node 102 that is hosting the data cache 112. If there are no compute nodes 102 hosting the data cache 112 for this file operation, then the storage middle-layer can propagate the file operation to the distributed filesystem 204. The storage middle-layer 210 can further provide information about the bandwidth of the file I/O between any two workflow nodes.

An optional privacy module 206 can also transparently mutate file operations. There are several ways to achieve this feature. In some embodiments, file operations between the workflow nodes and the storage middle-layer 210 can be intercepted. In other embodiments, new data privacy workflow nodes can be created, where the sole purpose of these privacy workflow nodes is to pre-process and/or post-process workflow node inputs and/or outputs before they are processed by the workflow nodes of the workflows.

Figure 3:
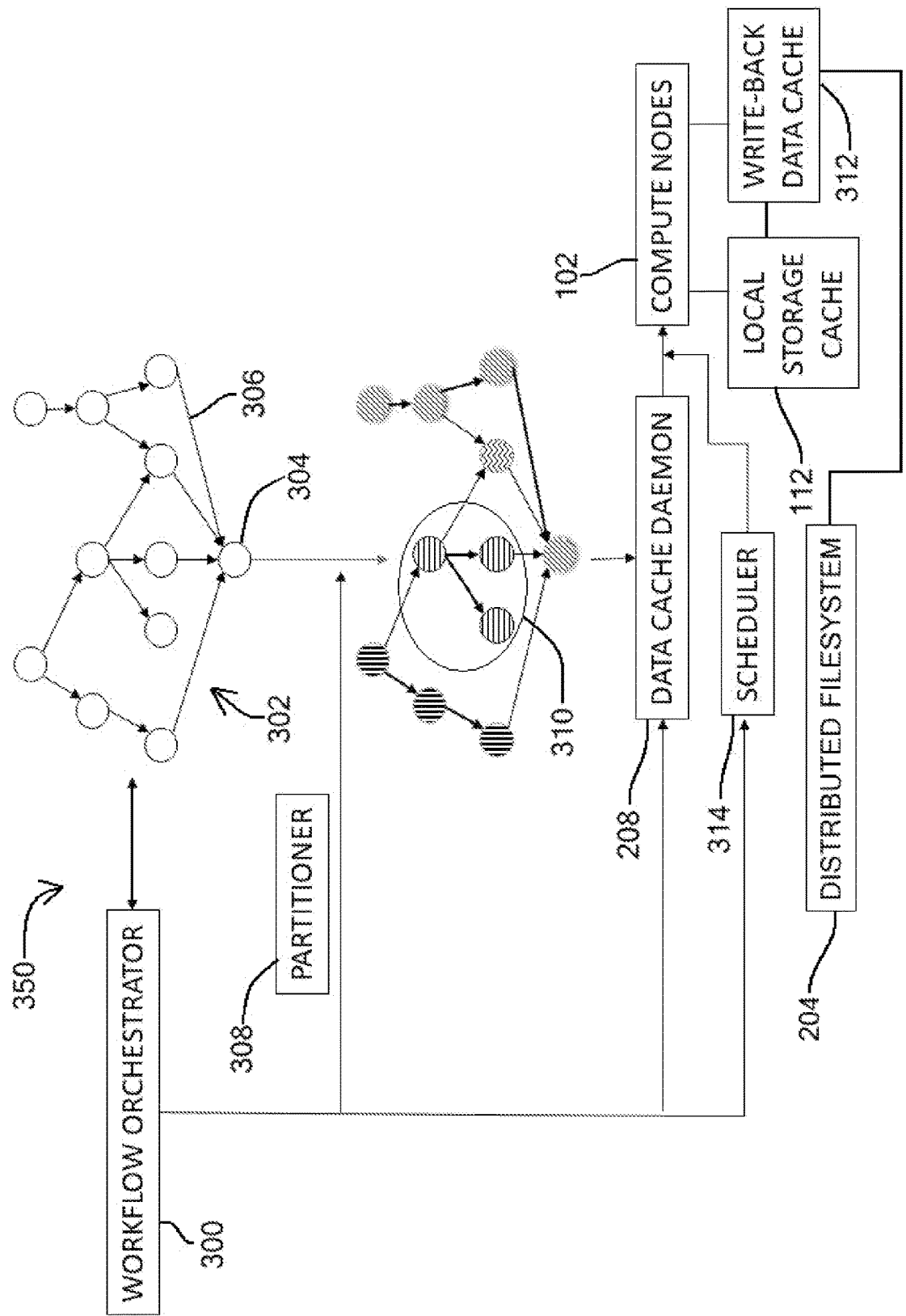
FIG. 3 illustrates components of a workflow optimization system, according to an embodiment of the present disclosure.

Referring to FIG. 3, a workflow orchestrator 300 of a workflow optimization system 350 can traverse a workflow 302 (also referred to as acyclic directed graph 302, or simply, graph 302) and estimate the size in bytes of the expected file input/output (I/O) of each consumer (cons) of each workflow node 304 with respect to each of the producers (prod) for each workflow node 304. In some embodiments, this act can assign a weight to all edges (prod to cons) 306, where the edges 306 estimate the expected data transfer between tasks of prod and cons.

In the presence of the optional metadata database 114 (see FIG. 1), the workflow orchestrator 300 can query the metadata database 114 for information about past instances of the workflow node tasks. A metadata query may not return matches either because the metadata database 114 is not present, or because the metadata database 114 does not include information for the workflow node in question. If no metadata is returned for a workflow node, as a failback, the workflow orchestrator 300 can monitor the file I/O of the workflow node's tasks for some amount of time via the optional storage middle-layer 210 (see FIG. 2). If I/O monitoring is not feasible (e.g., due to technical reasons or lack of the storage middle-layer 210), then the workflow orchestrator 300 can estimate the data transfer for the edge (prod to cons) is the entire size of the working directory of the producer workflow node.

The workflow orchestrator 300 can include a partitioning module 308 that can partition the workflow 302 into sub-graphs 310 based on the file I/O of the workflow nodes 304. Workflow nodes 304 belonging to the same sub-graph 310 have high intra-sub-graph file I/O. The workflow orchestrator 300 can choose not to include a workflow node in any sub-graph 310 if the file I/O of the workflow node is expected to be low or if grouping the workflow node in question with a different sub-graph, or no sub-graph at all, is expected to result in better workflow performance and/or MakeSpan. Workflow nodes without assignment to a sub-graph can access data generated by other workflow nodes that are part of a sub-graph either via available neighboring compute nodes 102 (see FIGS. 1 and 2) that host the data cache, or, if that is not possible, via the regular distributed filesystem.

Workflow nodes can be added to an existing sub-graph 310 while the workflow 302 is being executed. This is a safe operation because of the high level of transparency offered by the optional storage middle-layer 210 (see FIG. 2). In the event that the storage middle-layer 210 is omitted, downstream workflow nodes can consume the contents of data caches once the write-back data caches are written back to the distributed filesystem. Because the data caches are write-back, a workflow node can safely change sub-graphs without loss of functionality. However, the workflow orchestrator 300 may choose not to move a workflow node to a different sub-graph if the difference between the expected file I/O to or from the two sub-graphs is not large enough or if moving the workflow node to a different sub-graph is not expected to improve the workflow MakeSpan and/or performance The workflow orchestrator 300 can instruct the data cache daemon 208 to provision write-back data caches 312 of newly added workflow nodes to multiple compute nodes, where the number of compute nodes, N, depends on a) the resource requirements of active workflow node tasks that belong in the same sub-graph, and b) the resource capacity of the compute nodes in the cloud/HPC instance. A naïve implementation could use a static number for N. The optional storage middle-layer can safely reconfigure the compute nodes which execute tasks of workflow nodes that are switching sub-graphs or are assigned a sub-graph after their initial execution, towards the new storage destination (i.e., the designated data cache).

The workflow orchestrator 300 can instruct a scheduler 314 of the cloud/HPC instance to try and place the tasks of workflow node (X) to a compute node that includes either the data cache associated with workflow node (X), or the data cache associated with workflow node (Y), where workflow node (Y) is a workflow node that belongs to the same sub-graph as (X) and the enveloping workflow includes either an X to Y edge or a Y to X edge (i.e., workflow node (Y) reads files produced by workflow node (X) or workflow node (X) reads files produced by workflow node (Y)).

In one embodiment, a workflow framework can be used for the desired workflow, where an off-the-shelf algorithm can partition the workflow graph based on the file I/O between the workflow nodes as edge-weights. The storage middle-layer can be implemented in the form of a kernel module. Data Lifecycle Framework (DLF) can be used as the data cache daemon to generate instances of datasets on compute nodes to be used by the workflow node tasks as data caches. The distributed filesystem can be, for example, general parallel file system (GPFS). The distributed database API of the workflow framework can be powered by a MongoDB instance, for example, to hold metadata about past executions of workflows.

Figure 4:
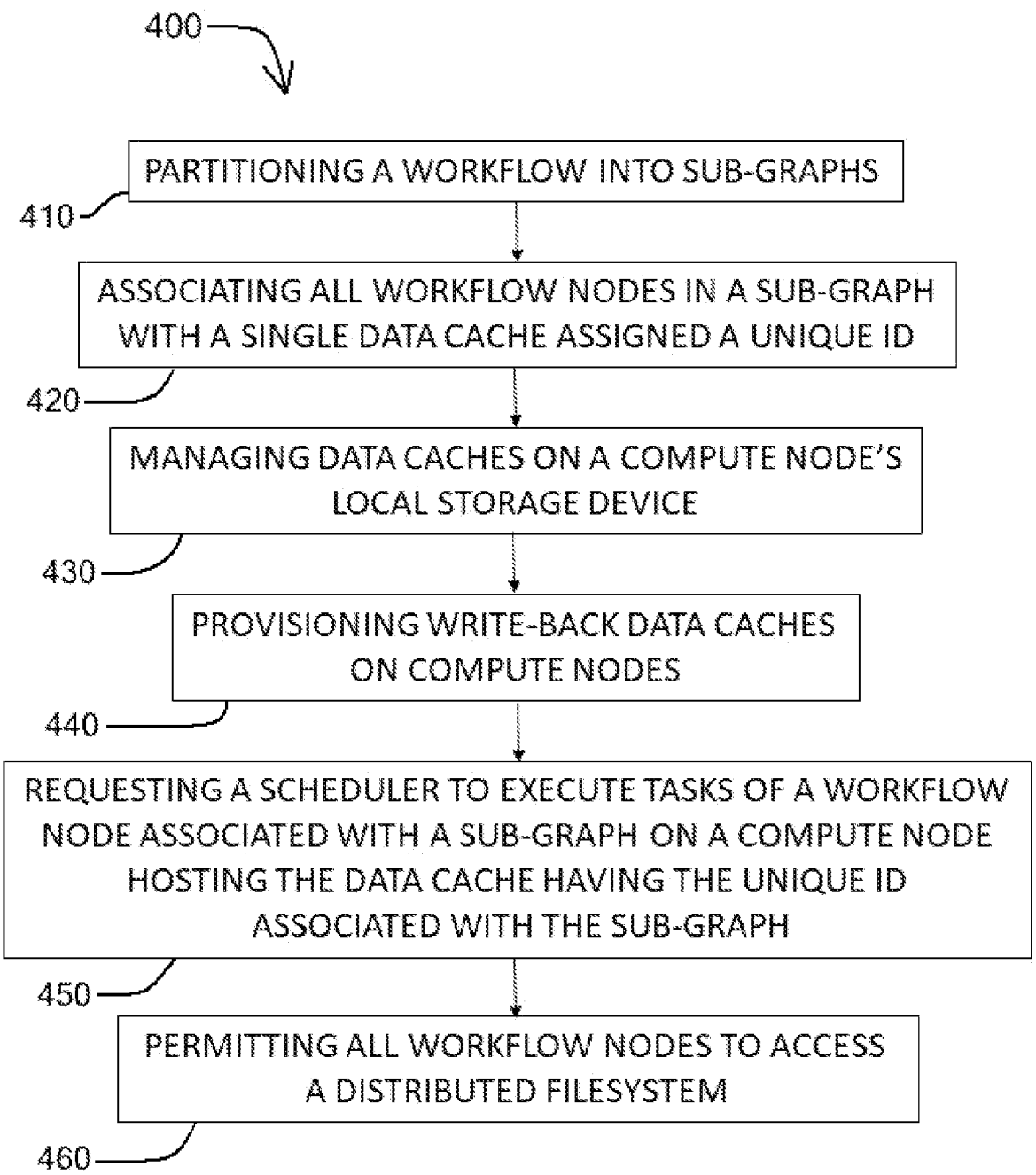
FIG. 4 illustrates a flow chart illustrating acts involved with optimizing workflows with dynamic file caching, consistent with an illustrative embodiment.

With the foregoing overview of the example workflow optimization system 350 (see FIG. 3), it may be helpful now to consider a high-level discussion of example processes. To that end, FIG. 4 presents an illustrative process 400 related methods of optimization workflows with the system 350. Process 400 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 4, the process 400 for optimizing a workflow with dynamic file caching includes an act 410 of partitioning a workflow into subgraphs. The sub-graphs can be configured such that workflow nodes in the same sub-graph have high intra-sub-graph file I/O. An act 420 can include associating all workflow nodes in a sub-graph with a single data cache assigned a unique ID. Multiple nodes of a sub-graph can be assigned to this single data cache. An act 430 can include managing data caches on a compute node's local storage device that offer high bandwidth file I/O to tasks of workflow nodes that are scheduled on the same compute node. An act 440 can include provisioning write-back data caches on the compute nodes. An act 450 can include requesting a scheduler to execute tasks of a workflow node, which is associated with a particular sub-graph, on a compute node hosting the data cache having the unique ID associated with the sub-graph that the workflow node belongs. An act 460 can include permitting all the workflow nodes to access a distributed filesystem, where workflow nodes can access files produced by other workflow nodes.

Figure 5:
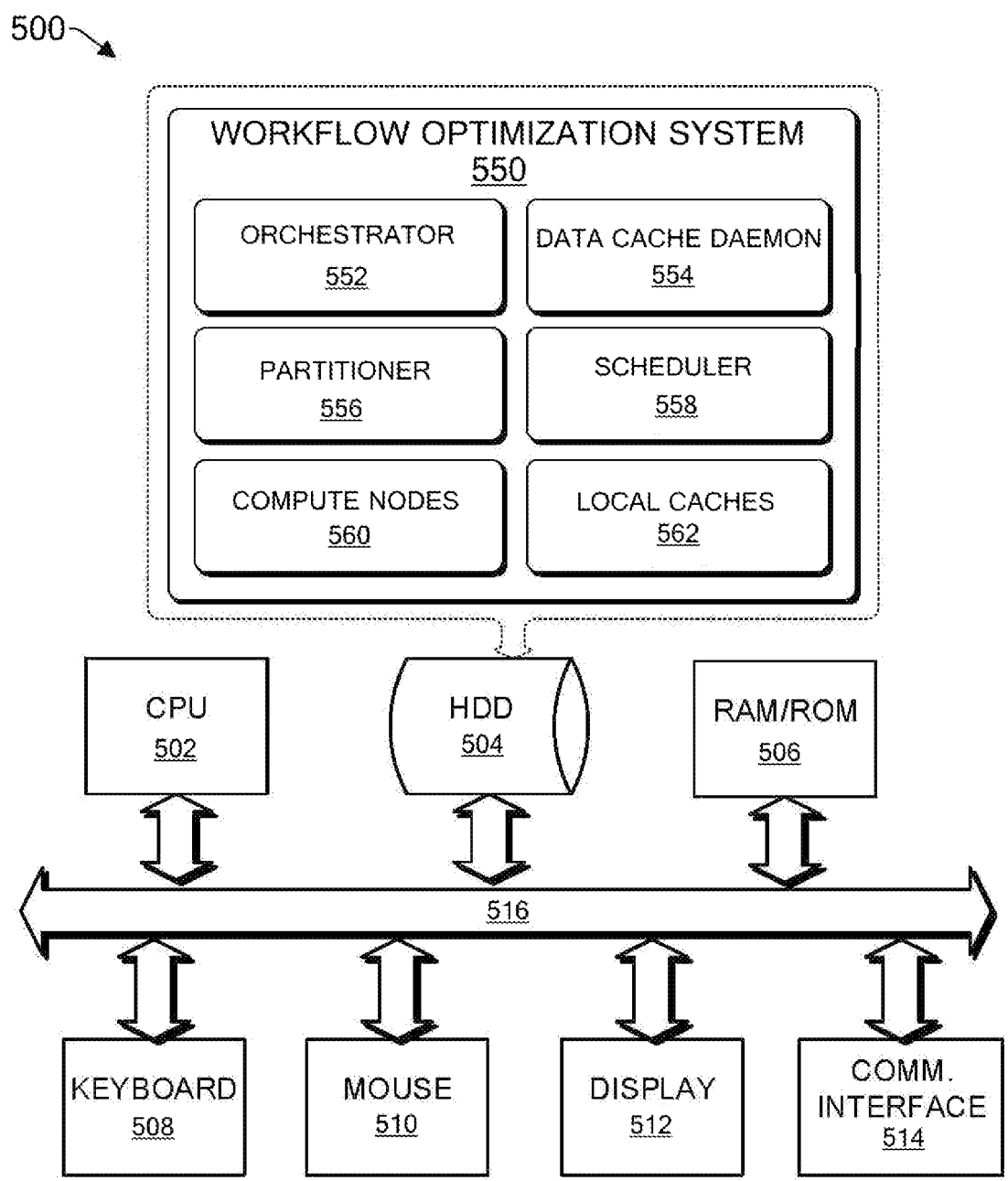
FIG. 5 is a functional block diagram illustration of a computer hardware platform that can be used to implement the workflow optimization system of FIG. 3.

FIG. 5 provides a functional block diagram illustration of a computer hardware platform 500 that can be used to implement a particularly configured computing device that can host a workflow optimization system 550. The workflow optimization system 550, as discussed above, can include a workflow orchestrator 552, a data cache daemon 554, a partitioner module 556, a scheduler module 558, a plurality of compute nodes 560, and a plurality of local data cache modules 562 operable to control a local cache on the compute nodes.

The computer platform 500 may include a central processing unit (CPU) 502, a hard disk drive (HDD) 504, random access memory (RAM) and/or read only memory (ROM) 506, a keyboard 508, a mouse 510, a display 512, and a communication interface 514, which are connected to a system bus 516.

In one embodiment, the HDD 504, has capabilities that include storing a program that can execute various processes, such as the workflow optimization system 550, in a manner described herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method optimizing performance of computational workflows, comprising:
    associating each of a plurality of workflow nodes in a workflow with, at most, one respective data cache;
    partitioning the workflow into a plurality of sub-graphs based on an expected file input/output for each workflow node, wherein each of the plurality of sub-graphs is defined by one or more sub-graph nodes and the workflow is enabled to transparently use high-bandwidth and/or low-latency storage devices to improve a MakeSpan and/or a performance of the workflow;
    managing the data cache on a local storage device on one of one or more compute nodes;
    requesting a scheduler to execute tasks of a given one of the plurality of workflow nodes on one of the one or more compute nodes that hosts the data cache associated with the given one of the plurality of workflow nodes;
    permitting each of the plurality of workflow nodes to access a distributed filesystem that is accessible to each of the plurality of compute nodes;
    permitting a select workflow node belonging to a first sub-graph to move to a second sub-graph based on a comparison of an expected file input/output of the select workflow node in the first sub-graph and the second sub-graph; and
    storing data produced by the tasks of the given one of the plurality of workflow nodes in the data cache.

2. The computer implemented method of claim 1, further comprising provisioning a write-back data cache on each of the plurality of compute nodes, the write-back data cache storing data to be copied to the distributed filesystem.

3. The computer implemented method of claim 1, further comprising associating the one or more sub-graph nodes in each of the plurality of sub-graphs to a single one of the data cache.

4. The computer implemented method of claim 3, further comprising querying a metadata database for information about past instances of the tasks of each workflow node to determine the expected file input/output for each workflow node.

5. The computer implemented method of claim 3, further comprising monitoring a file input/output of the tasks of each workflow node during execution of the workflow to determine the expected file input/output for each workflow node.

6. The computer implemented method of claim 1, further comprising monitoring a file input/output volume for each workflow node with a storage middle-layer.

7. The computer implemented method of claim 6, further comprising storing the monitored file input/output volume for each workflow node in a metadata database.

8. The computer implemented method of claim 6, further comprising orchestrating storage of data produced by each of the plurality of workflow nodes into the data cache associated with each of the plurality of workflow nodes.

9. The computer implemented method of claim 8, further comprising upon determining that the scheduler is unable to execute tasks of the given one of the plurality of workflow nodes on the one of the compute nodes that hosts the data cache associated with the given one of the plurality of workflow nodes, redirecting writing of data produced by the given one of the plurality of workflow nodes to the one of the compute nodes that hosts the data cache associated with the given one of the plurality of workflow nodes.

10. The computer implemented method of claim 1, further comprising transparently mutating files between workflow nodes to provide data privacy.

11. A computer implemented method for optimizing performance of computational workflows, comprising:
partitioning the workflow into a plurality of sub-graphs based on an expected file input/output for each node of the workflow, wherein each of the plurality of sub-graphs is defined by one or more sub-graph nodes and the workflow is enabled to transparently use high-bandwidth and/or low-latency storage devices to improve a MakeSpan and/or a performance of the workflow; and
associating each of the one or more sub-graph nodes in each of the plurality of sub-graphs to, at most, one respective data cache;
associating each data cache with a unique identification, wherein each of the unique identification is further associated with respective ones of each of the plurality of sub-graphs;
managing each data cache on a local storage device on one of one or more compute nodes;
requesting a scheduler to execute tasks of a given one of the plurality of workflow nodes on one of the one or more compute nodes that hosts the data cache associated with the given one of the plurality of workflow nodes based on the unique identification;
permitting each of the plurality of workflow nodes to access a distributed filesystem that is accessible to each of the plurality of compute nodes;
permitting a select workflow node belonging to a first sub-graph to move to a second sub-graph based on a comparison of an expected file input/output of the select workflow node in the first sub-graph and the second sub-graph; and
storing data produced by the tasks of the given one of the plurality of workflow nodes in the data cache.

12. The computer implemented method of claim 11, further comprising querying a metadata database for information about past instances of the tasks of each workflow node to determine the expected file input/output for each workflow node.

13. The computer implemented method of claim 11, further comprising monitoring a file input/output of the tasks of each workflow node during execution of the workflow to determine the expected file input/output for each workflow node.

14. The computer implemented method of claim 11, further comprising monitoring a volume of file input/output for each workflow node with a storage middle-layer.

15. The computer implemented method of claim 14, further comprising storing the monitored file input/output volume for each workflow node in a metadata database.

16. The computer implemented method of claim 15, further comprising orchestrating a storage of data produced by each of the plurality of workflow nodes into the data cache associated with each of the plurality of workflow nodes.

17. A non-transitory computer readable storage medium tangibly embodying a computer readable program code having computer readable instructions that, when executed, causes a computer device to carry out a method of optimizing performance of computational workflows, the method comprising:
partitioning a workflow into a plurality of sub-graphs based on an expected file input/output for each workflow node of a plurality of workflow nodes;
associating each of the plurality of nodes of each of the plurality of sub-graphs with, at most, one respective data cache;
managing the data cache on a local storage device on one of one or more compute nodes;
requesting a scheduler to execute tasks of a given one of the plurality of workflow nodes on one of the one or more compute nodes that hosts the data cache associated with the given one of the plurality of workflow nodes; and
permitting each of the plurality of workflow nodes to access a distributed filesystem that is accessible to each of the plurality of compute nodes; permitting a select workflow node belonging to a first sub-graph to move to a second sub-graph based on a comparison of an expected file input/output of the select workflow node in the first sub-graph and the second sub-graph, wherein
storing data produced by the tasks of the given one of the plurality of workflow nodes in the data cache.

18. The non-transitory computer readable storage medium of claim 17, wherein the execution of the code by the processor further configures the computing device to perform an act comprising monitoring a volume of file input/output for each workflow node with a storage middle-layer.

* * * * *